Feb. 1, 1966  TAKASHI CHANO  3,232,390
SHOCK ABSORBER INCLUDING SPRING LOADED VALVE IN PISTON
Filed July 3, 1963  2 Sheets-Sheet 1

INVENTOR.
TAKASHI CHANO
BY
Mason, Fenwick & Lawrence
ATTORNEYS

United States Patent Office 3,232,390
Patented Feb. 1, 1966

3,232,390
SHOCK ABSORBER INCLUDING SPRING
LOADED VALVE IN PISTON
Takashi Chano, Kita-ku, Tokyo, Japan, assignor to
Kayaba Industry Co., Ltd., Tokyo, Japan, a corporation of Japan
Filed July 3, 1963, Ser. No. 293,241
4 Claims. (Cl. 188—88)

This invention concerns with a shock absorber, particularly with a shock absorber provided between a main frame of a car body and a suspension spring so as to efficiently absorb the energy of sudden shocks caused from the movement of the car.

Considering a vibrating system with two degrees of freedom shown in FIG. 1, when a car provided with a conventional shock absorber runs on an undulated or uneven road, it is observed that such a shock absorber is usually subjected to two kinds of resonances, namely, a primary resonance caused from sprung weight SW such as a car body and a secondary resonance caused from unsprung weight UW such as a wheel. Restriction of such resonances may be possible to some extent by applying a shock absorber SA of this system, but it is not desirable to use such shock absorber except the neighbourhood of the resonance area as shown in FIG. 2 illustrating diagrammatically the characteristic curves of the acceleration resonance. Curve A indicates a system without shock absorber, damping force being zero. Curve B indicates a system in which sprung weight and unsprung weight are connected to each other, damping force being infinite. Curve C indicates a system with a conventional shock absorber. Curve D indicates a system with a shock absorber according to this invention. FIG. 2 shows that as the damping force is small, the acceleration of the sprung weight is so much minimized in the vibration range of P–Q or over R. This disadvantage appears so significantly in the area over the secondary resonance R where accelerated vibration is particularly high, as the absolute value of acceleration is so great in that area.

From such standpoint, the present invention is intended to provide, a shock absorber for producing a damping force similar to that of a conventional shock absorber for low vibration frequency than what is shown at the secondary resonance point R, while, providing much smaller or inefficient damping force for a higher vibration frequency, so that it can reduce the acceleration of sprung weight and increase the apparent strength of the car body, and, as a consequence, will give a great comfort to a car user.

According to the present invention, the shock absorber in the case of a motor-car, etc., is characterized in that an upper compression chamber and a lower compression chamber are formed on each side of a valve closing the lower portion of the oil passage provided in a piston; the said lower compression chamber is provided with an oil chamber varying in volume in response to the inner pressure, the said oil chamber being connected to the upper portion of the piston through an orifice, so that the pressure in the oil chamber may diminish so much as the vibration due to pressure difference in the upper portion of the piston is high, thus reducing the pressure in the lower compression chamber when the vibration frequency is high and lowering the damping force so much.

The present invention will now be described in detail with reference to the accompanying drawings, in which.

Figure 1:
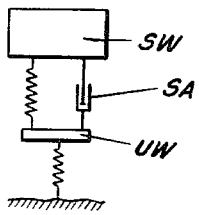
FIG. 1 shows equivalent system of a shock absorber.

An embodiment according to the invention will be described referring to FIG. 3.

A piston 5 is fixed with a fitting 6 on the foremost end of a piston rod 2 fitted into a cylinder 1 and has inside and outside oil passages 3, 4 penetrating therein in an axial direction. On the upper portion of the said piston 5 is provided a check valve 8 closing the valve seat of the oil passage 3 by means of a compression spring 7 for checking the flow of oil from the upper portion to the lower portion of the piston 5. In the oil passage 4 is provided sub-leaf valve 9 having its inner circumferential surface fixed in the lower portion of the piston 5 by means of a fitting 6. The sub-leaf valve 9 is operative in conjunction with a main valve retainer 11 movable up and down along with the fitting 6 by means of a coil spring 10 which enables the valve 9 to close the valve seat of the oil passage 4 and thus prevent the flow of oil from the lower portion of the piston to the upper portion of the piston 5.

On the sides of the sub-leaf valve 9 are formed an upper compression chamber A and a lower compression chamber B respectively on the oil passage 4 in the piston 5 and on the fitting 6 portion corresponding to the said oil passage 4, keeping the compression area of the said upper compression chamber A against the sub-leaf valve 9 slightly larger than the compression area of the lower compression chamber B against the sub-leaf valve 9. Further the lower pressure chamber B communicates with the upper portion of the piston 5 through the oil passage C in the piston rod 2, thereby affording a force compensating for the force applied on the sub-leaf valve 9 by the main valve retainer 11 through a coil spring 10. Between the upper portion of the piston 5 and the oil chamber C there is provided an orifice 12. The bottom portion of the said oil chamber C consists of a piston 13 fitted slidably into the fitting 6; the said piston 13 being always pushed upward by means of a spring 14 but enabled to descend in response to the pressure in the oil chamber C, thus to vary the volume of the said oil chamber C.

The operating principle of the present invention will be understood by the following description:

The magnitude of the damping force of the above-mentioned shock absorber depends on the opening of the sub-leaf valve 9 and the quantity of flow of the oil passing therethrough, said opening of the sub-leaf valve 9 becoming proportionately larger with the increase of force to be afforded on the said valve 9. It means that the opening of the sub-leaf valve 9 is proportional to the pressure difference of the upper compression chamber A and the lower compression chamber B, while the pressure of the lower compression chamber B will be defined by the operation of the orifice 12, piston 13, and spring 14. If the period of frequency of pressure variation of the upper compression chamber A becomes short, the pressure difference between the upper compression chamber A and the lower compression chamber B becomes large. Thus, when the period of pressure variation of the upper compression chamber A becomes short, namely accelerated vibration for the shock absorber becomes large, the said pressure difference becomes large and consequently the opening of the sub-leaf valve 9 also becomes large and therefore reduces the damping force. Thus, by choosing the flow resistance of the orifice 12 and the constant of the spring properly, the damping force can be made smaller or inefficient for the vibration of high frequency over the secondary resonance R.

Figure 3:
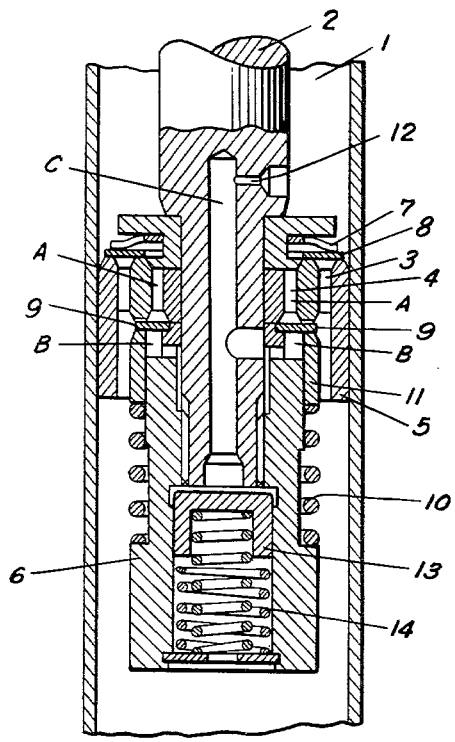
FIG. 3 is a sectional elevation of part of the shock absorber according to this invention.
Figure 2:
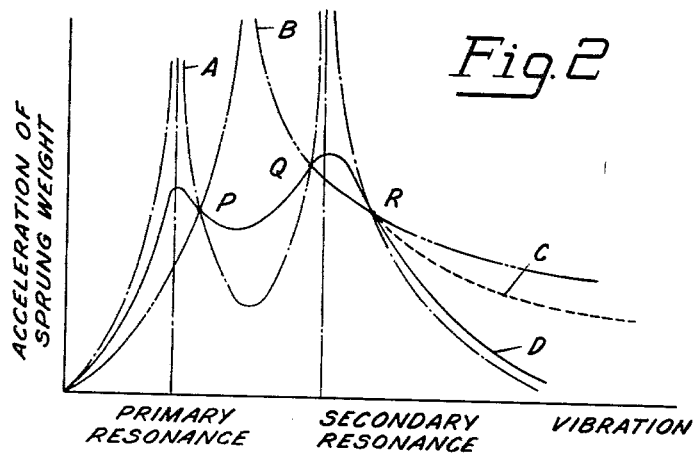
FIG. 2 is a diagram of the characteristic curves of acceleration resonance.
Figure 4:
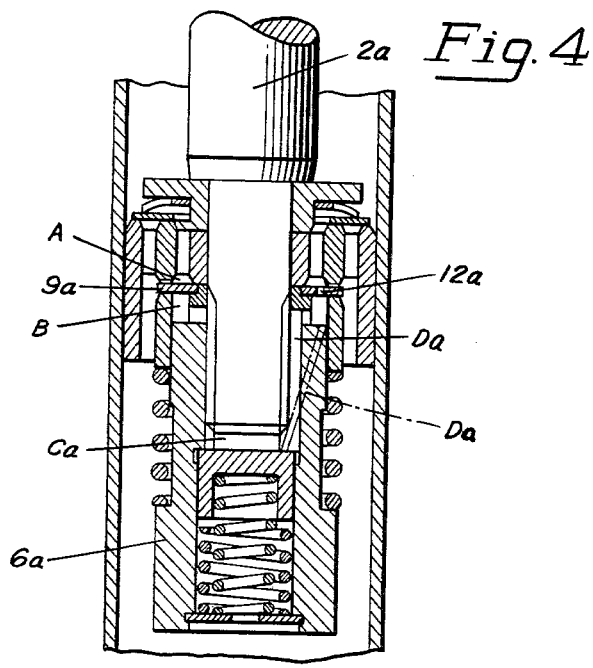
FIG. 4 shows one modified embodiment of this invention.

An embodiment shown in FIG. 4 is different from the embodiment shown in FIG. 3 in that the oil chamber Ca is formed in a piston nut 6a without being provided in the piston rod 2a and communicates with lower compression chamber through the passage Da along the inner circumference of the nut and further communicates with the upper compression chamber through the orifice 12a, but still is the same in the function and effect. The passage Da can be provided as shown in the broken lines. Various modifications may be made without departing from the scope of claims of the invention. For example, the spring acting on the free piston may be single one only and a diaphragm, bellows or other resilient body may be arranged in the fitting 6, substituting for a free piston.

What is claimed is:

1. A shock absorber comprising an elongated housing means containing a fluid, a piston rod mounted in said housing means for movement along the length thereof, a piston head mounted on said piston rod within said housing means, said piston head being disposed in sealing relation with said housing means to provide upper and lower fluid chambers, said piston head having a first fluid passageway communicable with said upper and lower fluid chambers, a check valve mounted on said piston head operable for opening said first fluid passageway when said piston head is moved in a first direction toward said lower fluid chamber, said piston head having a second fluid passageway communicable with said upper fluid chamber and said lower fluid chamber, a valve element in said second fluid passageway, yieldable means for urging said valve element in the closed position, said piston head having an upper compression chamber communicable with said second fluid passageway and a side of said valve element and a lower compression chamber communicable with an opposite side of said valve element, said piston head and rod having a third fluid passageway communicable with said lower compression chamber and said upper fluid chamber, a portion of said third fluid passageway being restricted, said piston rod and head having a variable volume chamber communicable with said third fluid passageway and the area of said side of said valve element exposed to said upper compression chamber being greater than the area of said opposite side of said valve element exposed to said lower compression chamber.

2. A shock absorber comprising an elongated housing means containing a fluid, a piston rod mounted in said housing means for movement along the length thereof, a piston head mounted on said piston rod within said housing means, said head being disposed in sealing relation with said housing means to provide upper and lower fluid chambers, said piston head having a first fluid passageway communicable with said upper and lower fluid chamber, a check valve mounted on said piston head operable for opening said first fluid passageway when said piston head is moved in a first direction axially toward said lower fluid chamber, said piston head having a second fluid passageway communicable with said upper fluid chamber and said lower fluid chamber, a valve element in said second fluid passageway, an axially movable retainer member mounted on said piston head engageable with said valve element, biasing means for urging said movable retainer member into engagement with said valve element to close said second fluid passageway, said piston head having an upper compression chamber communicable with said second fluid passageway and a side of said valve element and a lower compression chamber communicable with an opposite side of said valve element, said piston head and rod having a third fluid passageway communicable with said lower compression chamber and said upper fluid chamber, a portion of said third fluid passageway being restricted, said piston rod and head having a variable volume chamber communicable with said third fluid passageway and the area of said side of said valve element exposed to said upper compression chamber being greater than the area of said opposite side of said valve element exposed to said lower compression chamber.

3. A shock absorber comprising a cylindrical housing member containing a fluid, a piston rod mounted in said housing member for axial movement therein, a piston head mounted on said piston rod within said housing member, said piston head being disposed in sealing relation with said housing member to provide upper and lower fluid chambers, said piston head having a first fluid passageway communicable with said upper and lower fluid chambers, a check valve mounted on said piston head operable for opening said first fluid passageway when said piston head is moved in a first direction axially toward said lower fluid chamber, said piston head having a second fluid passageway communicable with said upper fluid chamber and said lower fluid chamber, a valve element in said second fluid passageway, an axially movable retainer member engageable with said valve element mounted on said piston head, a compression spring interposed between said movable retainer member and said piston head for urging said movable retainer member into engagement with said valve element to close said second fluid passageway, said piston head having an upper compression chamber communicable with said second fluid passageway and a side of said valve element and a lower compression chamber communicable with an opposite side of said valve element, said piston head and rod having a third fluid passageway communicable with said lower compression chamber and said upper fluid chamber, a portion of said third fluid passageway being restricted, said piston rod and head having a variable volume chamber communicable with said third fluid passageway, said variable volume chamber having a movable piston mounted therein and a second compression spring interposed between said piston in said variable volume chamber and said piston head for urging said piston into said variable volume chamber and the area of said side of said valve element exposed to said upper compression chamber being greater than the area of said opposite side of said valve element exposed to said lower compression chamber.

4. A shock absorber according to claim 3, wherein the compressive force of said first named spring is greater than the compressive force of said second mentioned spring.

References Cited by the Examiner

UNITED STATES PATENTS

| 2,161,811 | 6/1939 | Grebe | 188—88 |
| 2,924,305 | 2/1960 | Roder | 188—88 |
| 2,934,175 | 4/1960 | Schnitzer | 188—88 |
| 3,001,611 | 9/1961 | Schnitzer | 188—88 |

MILTON BUCHLER, *Primary Examiner.*

EUGENE G. BOTZ, ARTHUR L. LA POINT,
*Examiners.*

H. R. FIELD, G. E. A. HALVOSA, *Assistant Examiners.*